3,207,609
EGG PRODUCT
William A. Gorman, Lake Bluff, Charles K. Stearns, Prospect Heights, and Samuel M. Weisberg, Wilmette, Ill., assignors to National Dairy Products Corporation, New York, N.Y., a corporation of Delaware
No Drawing. Filed Nov. 12, 1964, Ser. No. 410,792
3 Claims. (Cl. 99—114)

This application includes subject matter which is common to the subject matter set forth in United States application Serial No. 218,543, filed August 22, 1962, which is now abandoned in favor hereof.

The present invention relates to food products prepared from eggs. More particularly, it relates to a dry egg white product suitable for the preparation of various foods. The product has low calorie content, low cholesterol level, and in the preferred embodiment includes glycerides in which unsaturated fats are predominant.

Whole eggs have long been recognized as a desirable and appetizing food in the human diet. Whole eggs provide substantial amounts of protein and fat, in addition to other essential constituents of a proper diet. As a result, whole eggs have been utilized in a multitude of foods, in addition to being consumed as such.

However, there has recently been substantial emphasis placed upon the desirability of a diet which includes primarily liquid (unsaturated) fats, as distinguished from solid (saturated) fats. There has also been substantial emphasis placed upon the desirability of a diet which comprises a minimum of cholesterol. While medical opinion on the question of the effectiveness of such a diet is in conflict, there has nevertheless been much publicity given thereto, with the result that substantial numbers of persons presently prefer to avoid foods including the above-mentioned substance.

Since whole eggs include substantial levels of saturated fat and of cholesterol, many people have substantially reduced or even eliminated whole eggs from their diet. Essentially all of the saturated fat and cholesterol in whole eggs are contributed by the egg yolk; in contrast, egg white, or the egg albumen, is essentially protein, which is recognized as a desirable and necessary dietary component.

It is therefore desirable to provide a tasteful and appetizing egg product in which the levels of saturated fat and cholesterol are minimized, in order to enable those persons who choose to exclude those materials from their diet to nevertheless enjoy the nutritional benefits of the protein and other nutrients in egg albumen. At the same time, it would also be desirable that the egg product have a low calorie content.

Accordingly, it is the principal object of the present invention to provide a dry egg white product suitable for the preparation of a variety of foods in which whole eggs are conventionally used. A more particular object of the present invention is to provide such an egg white product which has low levels of saturated fats and cholesterol, and low calorie content. Other objects and advantages of the present invention will become apparent from the following description and claims.

Generally, in accordance with the teachings of the present invention, there is provided a dry egg white product in powder form which is rapidly and efficiently dispersed in a liquid or semi-liquid media, e.g., water or milk for the preparation of food products. Rapid and efficient reconstitutability of such a powdered product is important to the consumer, and, as will be more fully described, is obtained by the practice of the present invention.

More particularly, in accordance with the present invention, the dry egg white product comprises dried egg albumen (dry egg white), a water-binding carbohydrate, agglomerated milk solids, and an edible oil. As will be pointed out more particularly, the edible oil is not intimately distributed within the indicated dry constituents, but is blended therewith so that it is present primarily on the surface of the dry constituents.

The dried egg albumen comprises between about 30 and about 50 percent by weight of the dry egg white product. A preferred level is about 40 percent by weight of the mix.

The water-binding carbohydrate comprises between about 15 percent and about 30 percent by weight of the product of the present invention. A preferred level of the water-binding carbohydrate is about 20 percent.

The agglomerated milk solids comprises between about 15 percent and about 30 percent by weight of the product of the present invention. A preferred level is about 20 percent by weight of the mix.

The edible oil comprises between about 3 percent and about 30 percent by weight of the product of the present invention.

The dried egg albumen desirably is a spray-dried product. Preferably, in order to provide a product having optimum color and flavor, the albumen is subjected to treatment to effect depletion of its contained glucose prior to spray drying. One method for effecting such treatment is that disclosed in United States Letters Patent No. 2,744,017.

The water-binding carbohydrate of the product comprises a cereal or root starch or flour which is capable of absorbing and binding water by virtue of its polymeric structure. Examples of such water-binding carbohydrates includes corn, tapioca, amioca, rice, and potato starches and flours. Preferably, the water-binding carbohydrate is capable of retaining water at elevated temperature conditions so that weeping does not occur during frying. One carbohydrate which is particularly suitable for the practice of the present invention is rice flour, which provides substantial advantages over other water-binding carbohydrates in preventing weeping under frying conditions.

The agglomerated milk solids comprises non-fat milk solids which has been treated to improve its water dispersibility. At present, such treatment comprises subjecting dry milk powder to water vapor, and thereafter effecting controlled adherence of the dry particles into larger agglomerates. One means for effecting such treatment is that disclosed and claimed in United States Letters Patent No. 3,042,526, assigned to the assignee of the present application.

The edible oil in the product of the present invention comprises a vegetable oil which is normally liquid at room temperatures. Such liquid oils include cottonseed oil, corn oil, soybean oil, safflower oil, peanut oil, etc. Desirably, the edible oil comprises a high percentage of unsaturated glycerides, such as safflower oil, corn oil, and soybean oil.

The oil is incorporated into the product of the present invention by mixing the oil with the remaining constituents in dry form. By such a dry mixing operation, the edible oil is not intimately distributed throughout the dry constituents, but instead is present primarily on the surface of the dry constituents. The method of incorporation of the edible oil into the product of the present invention is an important feature thereof, and is believed to be functionally related to the substantially improved dispersibility of the product of the present invention.

In this connection, a mixture of dried egg albumen and water-binding carbohydrate, without oil, is difficultly dispersible in water. While a mixture of these two constituents can be dispersed in water or batters and doughs and cooked to provide an acceptable food product, the time required for dispersion renders such a mixture of questionable value.

Also, in this connection, a mixture of dried egg albumen, water-binding carbohydrate, and agglomerated milk solids, without oil, while providing somewhat improved dispersibility in water, nevertheless requires substantial mixing and agitation to effect dispersion.

The dry egg white product of the present invention is rapidly and efficiently dispersible in water, milk, or batters and doughs. While it is not intended to restrict the scope of the present application to a particular theory, it is believed that the mechanism through which such improved dispersibility is obtained involves the provision of a partially hydrophobic surface on the dry constituents by the edible oil. As used herein, the term "partially hydrophobic" denotes the property of repelling water therefrom. It is thought that a partially hydrophobic surface tends to slow wetting of the dry constituents, and thus inhibits "clumping" thereof, which clumping is known as a cause of poor dispersibility of dry powders.

As pointed out above, the edible oil comprises between about 3 percent and about 30 percent by weight of the product of the present invention. At levels substantially below about 3 percent, the improvement in dispersibility of the mix is not as apparent, and at levels above about 30 percent of the mix, the dispersibility may in fact be impaired, presumably because of excessive hydrophobing of the dry constituents.

The product of the present invention may further include minor proportions of sugar, salt, spices, and coloring. In order to obtain maximum benefits from the added coloring, it is preferably incorporated in the liquid egg white prior to drying thereof, rather than incorporating the coloring into the dry ingredients.

It has further been discovered that the body and texture of the products made from the product of the present invention can be desirably improved by providing therein a buffering salt. The buffering salt is added at a level such that the product has a pH of about 8.5 to about 9.5. Examples of salts which may be utilized in accordance with the present invention are trisodium phosphate and tetrasodium pyrophosphate. Other condensed phosphate compounds may also be used, and, so long as the indicated pH is obtained, their choice is within the skill of the art.

EXAMPLE I

As an example of the practice of the present invention, a quantity of spray-dried egg albumen was prepared by desugaring liquid egg white by fermentation of contained glucose, and thereafter adding to the liquid egg white minor proportions of FD & C Yellow #5 and Yellow #6. The colored egg white was thereafter spray dried to provide a colored dried egg albumen.

The resultant dried egg albumen was blended with the remaining dry constituents in the amounts set forth in the following table:

Table 1

| Constituents: | Weight, grams |
|---|---|
| Dried egg albumen | 20 |
| Agglomerated non-fat milk solids | 10 |
| Rice flour | 10 |
| Trisodium phosphate | 2 |
| Dextrose | 0.4 |
| Salt, spices | 1.3 |

After the foregoing dry constituents were thoroughly blended, 5.34 grams of refined safflower oil was added incrementally to the dry constituents while the dry constituents were tumbled until satisfactory distribution of the oil was effected.

The resultant product had the following composition in weight percentages:

Table 2

| Constituents: | Percent by weight |
|---|---|
| Dried egg albumen | 40.8 |
| Agglomerated non-fat milk solids | 20.4 |
| Rice flour | 20.4 |
| Safflower seed oil | 10.9 |
| Trisodium phosphate | 4.1 |
| Dextrose | 0.8 |
| Salt, spices, color | 2.6 |
| | 100.0 |

The calorie content of the foregoing product was 3.5 calories per gram. In contrast, the calorie content of whole egg solids is about 6.2 calories per gram.

The cholesterol content of the foregoing product was about 0.01 mg. per gram, whereas the cholesterol content of whole egg solids is about 17.6 mg. per gram.

The ratio of polyunsaturated fat to saturated fat in the foregoing product was about 7.1:1. In contrast, the ratio of polyunsaturated to saturated fat in whole egg is about 0.8:1. Thus, the ratio of polyunsaturates to saturates in the product was nine times greater in whole egg.

The dry product of Example I may readily be dispersed in sufficient water or milk to provide a mixture having about the same solids level as liquid whole eggs (24–28% solids). The mixture may thereafter be used in place of liquid whole eggs, in a variety of dishes to provide a dish substantially equivalent thereto.

For example, the product of Example I was used to prepare a dish substantially equivalent to scrambled eggs, ordinarily prepared from whole eggs. 19.5 grams of the product of Example I was dispersed in about 78 grams of water to provide a batter. The powder dispersed rapidly and effectively in the water upon gentle stirring, to provide a smooth batter.

The following table sets forth the nutritional composition of the resultant batter and of conventional liquid whole egg:

| | Batter, percent by weight | Liquid whole egg, percent by weight |
|---|---|---|
| Fat | 2.4 | 11.5 |
| Protein | 9.6 | 12.8 |
| Water | 78.7 | 72–78 |
| Solids | 22.3 | 24–28 |

The calorie content of the batter was about 0.8 calorie per gram, whereas the calorie content of liquid whole egg is about 1.6 calories per gram.

The foregoing batter was fried to provide a scrambled egg dish. There was substantially no weeping of water during the frying operation, and the dish had desirably firm body and texture, and its flavor was excellent and fully equivalent to whole-egg scrambled. Ham, mushrooms, cheese, or the like may be added to the batter to provide an omelet-type dish substantially equivalent to whole-egg omlet in flavor, texture, and other characteristics.

Other foods which may be prepared utilizing the product of the present invention in place of whole eggs includes waffles, eggnog, biscuits, french toast, frying batters, custards, puddings, and the like.

Thus, there has been provided a dry egg white product which is rapidly and efficiently reconstitutable and which may be substituted for whole eggs in a wide variety of foods. The product comprises a minimum of cholesterol, and its contained fats are primarily unsaturated fats. The product has a desirable color which does not darken or change upon standing. The calorie content of the product is only about one-half as great as conventional whole eggs. The body, texture, and flavor of the dishes prepared therefrom are typical of dishes made utilizing whole eggs.

The product affords the consumer a low-cost product which may conveniently be utilized in place of whole eggs. Particular advantages of the product over whole eggs, in addition to the foregoing, include extended storage life without refrigeration, and economy of storage space.

Various of the features of the present invention are set forth in the following claims.

What is claimed is:

1. A method of producing a readily-dispersible dry egg white product for the preparation of egg dishes, comprising the steps of preparing a dry blend of 30 to 50 parts of dry egg albumen, 15 to 30 parts of an edible water-binding carbohydrate, and 15 to 30 parts of skim milk solids, and incrementally adding to the dry blend 3 to 30 parts of an edible oil while agitating the dry blend so that the edible oil is distributed primarily on the surface of the constituents of the dry blend.

2. A method of producing a readily-dispersible dry egg white product for the preparation of egg dishes, comprising the steps of preparing a dry blend of 30 to 50 parts of dry egg albumen, 15 to 30 parts of rice flour, and 15 to 30 parts of skim milk solids, and incrementally adding to the dry blend 3 to 30 parts of an edible oil while agitating the dry blend so that the edible oil is distributed primarily on the surface of the constituents of the dry blend.

3. The dry egg white product obtained in accordance with the method of claim 1.

References Cited by the Examiner

UNITED STATES PATENTS

| | | | |
|---|---|---|---|
| 458,420 | 8/91 | Furber | 99—114 |
| 1,302,486 | 4/19 | Dunham | 99—63 |
| 2,243,868 | 6/41 | Katzman | 99—92 |
| 2,628,904 | 8/51 | Healy | 99—114 |

A. LOUIS MONACELL, *Primary Examiner.*

UNITED STATES PATENT OFFICE
CERTIFICATE OF CORRECTION

Patent No. 3,207,609                          September 21, 1965

William A. Gorman et al.

It is hereby certified that error appears in the above numbered patent requiring correction and that the said Letters Patent should read as corrected below.

Column 4, line 26, after "greater" insert -- than --; in the table, heading to the last column, for "ty" read -- by --; same column 4, line 61, for "omiet" read -- omelet --.

Signed and sealed this 5th day of July 1966.

(SEAL)
Attest:

ERNEST W. SWIDER                          EDWARD J. BRENNER
Attesting Officer                             Commissioner of Patents